(12) United States Patent
Smith et al.

(10) Patent No.: US 12,631,338 B2
(45) Date of Patent: May 19, 2026

(54) PELLET COOKING STATION AND SYSTEM FOR IGNITING PELLETS AND METHOD THEREOF

(71) Applicant: North Atlantic Imports, LLC, Logan, UT (US)

(72) Inventors: Jared M. Smith, Paradise, UT (US); Tyler J. Fullmer, Smithfield, UT (US)

(73) Assignee: North Atlantic Imports, LLC, Providence, UT (US)

( * ) Notice: Subject to any disclaimer, the term of this patent is extended or adjusted under 35 U.S.C. 154(b) by 730 days.

(21) Appl. No.: 17/955,862

(22) Filed: Sep. 29, 2022

(65) Prior Publication Data

US 2023/0095611 A1    Mar. 30, 2023

Related U.S. Application Data

(60) Provisional application No. 63/250,453, filed on Sep. 30, 2021.

(51) Int. Cl.
F24B 1/20          (2006.01)
A23L 5/10          (2016.01)
          (Continued)

(52) U.S. Cl.
CPC    F24B 1/20 (2013.01); A23L 5/15 (2016.08); A47J 37/0704 (2013.01); A47J 37/079 (2013.01); F23Q 3/008 (2013.01); F23Q 13/02 (2013.01); *A23V 2002/00* (2013.01); *F23C 7/004* (2013.01); *F24B 13/04* (2013.01)

(58) Field of Classification Search
CPC ................ A47J 37/0713; A47J 37/0704; A47J 37/0727; A47J 37/0718; A47J 37/079;

A47J 37/0763; F23C 7/004; F23C 1/00–04; F23Q 13/02; F24B 1/20; F24B 13/04; F24B 13/02; F24B 3/00; F24B 5/00; F24B 5/02; F24B 5/021; F24B 5/028; F24B 40/08;
(Continued)

(56) References Cited

U.S. PATENT DOCUMENTS 4,823,684 A    4/1989  Traeger et al.
5,183,028 A    2/1993  Traeger et al.
              (Continued)

FOREIGN PATENT DOCUMENTS

KR        101313436        10/2013
KR        101313436 B1  *  10/2013

OTHER PUBLICATIONS

English translation to KR 101313436B1 (Year: 2013).*
(Continued)

*Primary Examiner* — Sang Y Paik
*Assistant Examiner* — Bonita Khlok
(74) *Attorney, Agent, or Firm* — David L. Stott

(57)          ABSTRACT

A heating system configured to employ pellets as a fuel source for cooking and configured to be initially ignited with a gas fuel. The heating system including a gas line configured to feed gas to a fire pot. The fire pot being located in a main body. The fire pot includes one or more screens to define a region within the fire pot such that the one or more screens are sized and configured to block pellets from entering the region. Further, the gas line is associated with a mixing structure configured to mix the gas fuel and oxygen together.

20 Claims, 10 Drawing Sheets

(51) Int. Cl.

| | |
|---|---|
| *A47J 37/07* | (2006.01) |
| *F23Q 3/00* | (2006.01) |
| *F23Q 13/02* | (2006.01) |
| *F23C 7/00* | (2006.01) |
| *F24B 13/04* | (2006.01) |

(58) Field of Classification Search

CPC .... F23B 90/02; F23B 60/00; F23B 80/00–04; F23B 40/00–08

USPC .......................................................... 99/339

See application file for complete search history.

(56) References Cited

U.S. PATENT DOCUMENTS

| | | | |
|---|---|---|---|
| 9,814,354 | B2 | 11/2017 | McAdams et al. |
| 10,045,546 | B2 | 8/2018 | Giebel et al. |
| 10,105,007 | B2 | 10/2018 | Colston et al. |
| 10,292,531 | B1 | 5/2019 | Hancock et al. |
| 10,426,295 | B2 | 10/2019 | McAdams et al. |
| 10,455,979 | B2 | 10/2019 | Colston et al. |
| 10,711,995 | B2 | 7/2020 | Traeger |
| 10,729,283 | B2 | 8/2020 | McAdams et al. |
| 10,806,301 | B2 | 10/2020 | Hancock et al. |
| 2007/0028912 | A1* | 2/2007 | Gagas ................. A47J 37/0704 |
| | | | 126/9 R |
| 2014/0326232 | A1 | 11/2014 | Traeger |
| 2017/0164783 | A1 | 6/2017 | Sauerwein et al. |
| 2019/0133374 | A1* | 5/2019 | McAdams .......... A47J 37/0713 |
| 2019/0290064 | A1* | 9/2019 | Colston .................... A47J 37/07 |
| 2019/0293285 | A1* | 9/2019 | Nett .......................... F23L 9/04 |
| 2019/0335949 | A1 | 11/2019 | Simon et al. |
| 2019/0365152 | A1 | 12/2019 | Dahle et al. |
| 2021/0270205 | A1* | 9/2021 | McDowell .............. F02G 1/055 |
| 2021/0278087 | A1* | 9/2021 | Hodges ................... F24B 1/187 |
| 2021/0369052 | A1 | 12/2021 | Fullmer et al. |
| 2022/0046937 | A1 | 2/2022 | Simon et al. |
| 2023/0091290 | A1* | 3/2023 | Levien ..................... F23N 1/00 |
| | | | 426/231 |

OTHER PUBLICATIONS

Webster definition to "Adjacent" (Year: 2025).*
Webster definition to "fin" (Year: 2025).*
Webster definition to "screen" (Year: 2025).*
International Search Report dated Jan. 17, 2023 for International Application No. PCT/US2022/077303 (11 pages).

* cited by examiner

PELLET COOKING STATION AND SYSTEM FOR IGNITING PELLETS AND METHOD THEREOF

CROSS-REFERENCE TO RELATED APPLICATIONS

This application claims the benefit of U.S. Provisional Application No. 63/250,453, filed Sep. 30, 2021, the disclosure of which is hereby incorporated by reference herein in its entirety.

TECHNICAL FIELD

The present invention relates generally to outdoor cooking stations and, more specifically, the present invention relates to igniting pellets of pellet fueled outdoor cooking stations.

BACKGROUND

Outdoor cooking has become a favorite pass time for many as they utilize its versatility from backyard parties to camping. As outdoor cooking has become more popular so have the different options of outdoor cooking stations. One type of outdoor cooking station is pellet fueled cooking stations. The pellets for pellet fueled cooking stations are pre-formed, compressed hardwood, are generally uniform in size, and can be purchased in large bagged quantities. These pre-formed and generally uniform sized pellets are typically made from hardwoods, such as oak, maple, apple, alder, mesquite, cherry, maple, hickory, and pecan wood, each of which provide a variation of smoky flavors. Further, the pellets of pellet fueled cooking stations are typically ignited by an electrically heated burner known as a hot rod. Such electrically heated burner, in combination with a fan, ignite the pellets. The heat generated by the burning pellets cooks the food and the smoke produced from the burning pellets can aid in the flavoring of the food. The problem with pellet fueled cooking stations in the outdoor cooking industry today is the length of time it takes to both ignite the pellets and obtain an optimal cooking temperature, relative to other outdoor cooking stations and their more traditional modes for heating/cooking, such as gas heated grills.

BRIEF SUMMARY OF THE INVENTION

The present invention is directed to a cooking system configured to employ pellets as a fuel source for cooking and configured to initially ignite the pellets with a gas fuel. The cooking system includes a main body extending to define a cooking portion and a heating portion. The cooking portion including a cooking surface where the heating portion is positioned below the cooking portion of the main body. The main body extending upwards above the cooking surface and a pellet feeding portion associated with the heating portion. The pellet feeding portion including a hopper and a pellet feeder. The hopper sized and configured to hold the pellets therein with a lower opening sized to funnel the pellets therethrough. The pellet feeder positioned adjacent the lower opening and configured to move the pellets from the lower opening. A gas line configured to feed gas to the heating portion of the main body. A fire pot positioned within the heating portion and extending to define an interior surface. The interior surface of the fire pot defining a feeder opening and a gas line opening. The feeder opening sized to facilitate the pellets move from the pellet feeder to within the fire pot. The fire pot including one or more metal screens and an ignitor. The one or more metal screens extending within the fire pot to define a region. The gas line having an end positioned to disperse gas within the fire pot and the ignitor positioned at least partially within the region defined by the one or more metal screens such that the one or more metal screens block the pellets from entering the region.

In another embodiment, the gas line extends to an end tube with an end such that the end tube extends through a hole defined in the interior surface of the fire pot with the end of the end tube positioned adjacent the interior surface of the fire pot. The end tube includes opposing openings defined in a side wall of the end tube to draw air flow into the end tube and through a mixing structure. The mixing structure is positioned within the end tube between the opposing openings and the end of the end tube such that the mixing structure is sized and configured to mix oxygen from the air flow with the gas fuel.

In another embodiment, the gas line is associated with a mixing structure located adjacent the end of the gas line, the mixing structure sized and configured to blend oxygen and gas to create a mixture thereof. In a further embodiment, the mixing structure includes curved fins sized and configured to swirl the oxygen and the gas. In another further embodiment, the mixing structure includes the one or more metal screens positioned within the fire pot, the one or more screens extending over an end of the gas line. In another embodiment, the gas line is associated with a mixing structure, the mixing structure including a screen associated with a tube of the gas line.

In another embodiment, the cooking system further includes a flame sensor and a thermocouple each positioned at least partially within the region defined by the one or more metal screens and each associated with a controller. Upon the gas fuel being fed through the gas line, the flame sensor is configured to sense if there is a flame after generating a spark with the ignitor, the thermocouple is configured to sense a temperature within the region, and the controller is configured to shut-off the gas fuel being fed through the gas line upon (1) the flame sensor not sensing a flame within a pre-defined time period, and (2) the thermocouple sensing a pre-defined temperature indicating that the pellets are sufficiently ignited. In a further embodiment, the controller is powered through at least one of a power cord and a battery.

In another embodiment, the one or more metal screens extend with multiple holes defined therein, the one or more metal screens sized and configured to block the pellets from the region to protect the flame sensor, the thermocouple and the ignitor, the multiple holes of the one or more metal screens sized and configured to allow for oxygen and gas to flow freely within the region and the fire pot. In another embodiment, the fire pot includes one or more air inlets to allow for air flow into the fire pot to fan the pellets being burned.

In another embodiment, the gas line includes an end tube where the end tube includes the end of the gas line and an air hole for drawing oxygen into the end tube. Further, the end tube includes a mixing structure located at the end of the gas line where the mixing structure blends oxygen and gas to create a mixture of the two. The mixing structure including a vertical component and a horizontal component where the vertical component and horizontal component are positioned and configured such that a T-shape is formed. Further, the vertical component and horizontal component extend towards the end of the end tube such that as the vertical component and the horizontal component approaches the end of the end tube, opposing ends of the vertical component and the horizontal component curve such that a propeller shape is formed.

In another embodiment, the region includes a flame sensor where the flame sensor is configured to shut off gas flow from the gas line. Further, the region includes a thermocouple where the thermocouple is configured to shuts off gas flow from the gas line.

In another embodiment, the one or more metal screens protect the thermocouple and flame sensor from the burning pellets. Further, the one or more metal screens include multiple holes to allow for oxygen and gas to flow freely within the region and fire pot where the heat produced freely flows throughout the region and fire pot. Where the fire pot includes one or more air inlets to allow for air flow into the fire pot to assist with heating the pellets.

In accordance with another embodiment of the present invention, a cooking system configured to employ pellets as a fuel source for cooking and configured to initially ignite the pellets with a gas fuel is provided. The cooking system including a main body, a pellet feeding portion, a gas line and a fire pot. The pellet feeding portion includes a hopper and a pellet feeder. The hopper sized and configured to hold the pellets therein with a lower opening sized to funnel the pellets therethrough. The pellet feeder is positioned adjacent the lower opening and configured to move the pellets from the lower opening. The gas line is configured to feed gas within the main body. The fire pot is positioned within the main body. The fire pot extending to define an interior surface. The interior surface of the fire pot defining a feeder opening and a gas line opening therein. The feeder opening sized to facilitate the pellets move from the pellet feeder to within the fire pot. The fire pot including one or more metal screens and an ignitor. The one or more metal screens extending within the fire pot to define a region therein. The gas line having an end positioned to disperse gas within the fire pot and the ignitor positioned at least partially within the region defined by the one or more metal screens such that the one or more metal screens block the pellets from entering the region.

In one embodiment, the gas line is associated with a mixing structure located adjacent the end of the gas line, the mixing structure sized and configured to blend oxygen and gas to create a mixture thereof. In a further embodiment, the mixing structure includes curved fins sized and configured to swirl the oxygen and the gas. In another embodiment, the mixing structure includes the one or more metal screens positioned within the fire pot, the one or more metal screens extending over the end of the gas line. In another embodiment, the gas line is associated with a mixing structure, the mixing structure including a screen associated with a tube of the gas line.

In another embodiment, the gas line includes an end tube where the end tube includes the end of the gas line and an air hole for drawing oxygen into the end tube. Further, the end tube includes a mixing structure located at the end of the gas line where the mixing structure blends oxygen and gas to create a mixture of the two. The mixing structure including a vertical component and a horizontal component where the vertical component and horizontal component are positioned and configured such that a T-shape is formed. Further, the vertical component and horizontal component extending towards the end of the end tube such that as the vertical component and the horizontal component approaches the end of the end tube opposing ends of the vertical component and the horizontal component lift such that a propeller shape is formed.

In another embodiment, the region includes a flame sensor where the flame sensor is configured to shut off gas flow from the gas line. Further, the region includes a thermocouple where the thermocouple is configured to shuts off gas flow from the gas line.

In another embodiment, the one or more metal screens protect the thermocouple and flame sensor from the burning pellets. Further, the one or more metal screens include multiple holes to allow for oxygen and gas to flow freely within the region and fire pot where the heat produced freely flows throughout the region and fire pot. Where the fire pot includes one or more air inlets to allow for air flow into the fire pot to assist with heating the pellets.

In accordance with another embodiment of the present invention, a heating system configured to employ pellets as a fuel source for cooking and configured to initially ignite the pellets with a gas fuel is provided. The heating system includes a gas line and a fire pot. The gas line is configured to feed gas to a main body where the gas line includes an end tube portion. The fire pot is positioned within the main body where the fire pot extends to define an interior surface. The interior surface of the fire pot defining a feeder opening and a gas line opening therein. The feeder opening sized to facilitate the pellets move from the pellet feeder to within the fire pot. The fire pot including one or more metal screens and an ignitor where the one or more metal screens extend within the fire pot to define a region therein. The end tube portion of the gas line having an end positioned to disperse gas within the fire pot and the ignitor positioned at least partially within the region defined by the one or more metal screens such that the one or more metal screens block the pellets from entering the region.

In one embodiment, the end tube portion is associated with a mixing structure located adjacent the end of the end tube portion, the mixing structure sized and configured to blend oxygen and gas to create a mixture thereof. In a further embodiment, the mixing structure includes curved fins sized and configured to swirl the oxygen and the gas. In another embodiment, the mixing structure includes the one or more metal screens positioned within the fire pot, the one or more screens extending over the end of the end tube portion. In another embodiment, the end tube portion is associated with a mixing structure, the mixing structure including a screen associated with the end tube portion of the gas line. In another embodiment, the end tube portion includes an air hole for drawing oxygen into the end tube portion. Further, the end tube portion includes a mixing structure located at the end of the gas line where the mixing structure blends oxygen and gas to create a mixture of the two. The mixing structure includes a vertical component and a horizontal component where the vertical component and horizontal component are positioned and configured such that a T-shape is formed. Further, the vertical component and horizontal component extends towards the end of the end tube portion such that as the vertical component and the horizontal component approaches the end of the end tube portion opposing ends of the vertical component and the horizontal component curve such that a propeller shape is formed.

In another embodiment, the region includes a flame sensor where the flame sensor is configured to shut off gas flow from the gas line. Further, the region includes a thermocouple where the thermocouple is configured to shuts off gas flow from the gas line.

In another embodiment, the one or more metal screens protect the thermocouple and flame sensor from the burning pellets. Further, the one or more metal screens include multiple holes to allow for oxygen and gas to flow freely within the region and fire pot where the heat produced freely flows throughout the region and fire pot. Where the fire pot includes one or more air inlets to allow for air flow into the fire pot to assist with heating the pellets.

In accordance to another embodiment of the present invention, a heating system configured to employ pellets as a fuel source for cooking and configured to initially ignite the pellets with a gas fuel is provided. The heating system includes a gas line, a mixing structure, and one or more metal screens. The gas line is configured to feed gas to a fire pot. The fire pot being located in a main body and the gas line including an end tube portion. The end tube portion includes an air hole where the end tube portion has an end positioned to disperse gas within the fire pot. The mixing structure is positioned between the air hole and the end of the end tube portion, the mixing structure being sized and configured to mix oxygen and the gas fuel together. The one or more metal screens coupled to an interior of the fire pot such that the screens extend to define a region within the interior of the fire pot, the one or more metal screens being sized and configured to block the pellets from the region.

In one embodiment, the mixing structure includes curved fins sized and configured to swirl the oxygen and the gas together. In another embodiment, the mixing structure includes the one or more metal screens positioned within the fire pot, the one or more screens extending over the end of the end tube portion. In another embodiment, the end tube portion is associated with a mixing structure, the mixing structure including a screen associated with the end tube portion of the gas line.

In another embodiment, the end tube portion includes an air hole for drawing oxygen into the end tube portion. Where the mixing structures vertical component and horizontal component are positioned and configured such that a T-shape is formed. Further, the vertical component and horizontal component extends towards the end of the end tube portion such that as the vertical component and the horizontal component approaches the end of the end tube portion, opposing ends of the vertical component and the horizontal component will curve such that a propeller shape is formed. Where the mixing structure blends oxygen and gas to create a mixture of the two.

In another embodiment, the region includes a flame sensor where the flame sensor is configured to shut off gas flow from the gas line. Further, the region includes a thermocouple where the thermocouple is configured to shuts off gas flow from the gas line. Where the one or more metal screens protect the thermocouple and flame sensor from the burning pellets.

In another embodiment, the one or more metal screens include multiple holes to allow for oxygen and gas to flow freely within the region and fire pot, and wherein, heat produced freely flows throughout the region and fire pot. The fire pot including one or more air inlets to allow for air flow into the fire pot to assist with heating the pellets.

In accordance with another embodiment of the present invention, a method for employing a gas fuel to initially ignite pellets as a fuel source for cooking is provided. The method includes the steps of: providing a main body extending to define a cooking portion and a heating portion, the cooking portion including a cooking surface, the heating portion positioned below the cooking portion of the main body, the main body extending upwards above the cooking surface; funneling the pellets into a pellet feeding portion associated with the heating portion, the pellet feeding portion including a hopper and a pellet feeder, the hopper sized and configured to hold the pellets therein with a lower opening sized to funnel the pellets therethrough, the pellet feeder positioned adjacent the lower opening and configured to move the pellets from the lower opening, a fire pot positioned within the heating portion, the fire pot extending to define an interior surface, the interior surface of the fire pot defining a feeder opening and a gas line opening therein, a gas line configured to feed gas to the fire pot and the associated heating portion of the main body, the feeder opening sized to facilitate the pellets to move from the pellet feeder to within the fire pot, the fire pot including one or more metal screens and an ignitor, the one or more metal screens extending within the fire pot to define a region therein, the gas line having an end positioned to disperse gas within the fire pot and the ignitor positioned at least partially within the region defined by the one or more metal screens such that the one or more metal screens block the pellets from entering the region; blending the gas fuel with oxygen with a mixing structure associated with the gas line; and igniting the blended oxygen and gas fuel within the fire pot to initially ignite the pellets.

In another embodiment, the blending step includes swirling the gas fuel and the oxygen together with the mixing structure having curved fins. In another embodiment, the blending step includes mixing the gas fuel and the oxygen together with the one or more screens extending over the end of the gas line. In another embodiment, the blending step includes mixing the oxygen and the gas fuel together with a screen associated with the gas line.

In another embodiment, the method further includes the step of sensing a temperature within the region with a thermocouple such that, upon reaching a certain temperature within the region, a controller shuts off the gas fuel from being fed through the gas line. In another embodiment, the method further includes the step of sensing a flame with a flame sensor within the region such that if no flame is sensed subsequent to an attempt to ignite the gas fuel then a controller shuts off the gas fuel from being fed through gas line.

In accordance with another embodiment of the present invention, a cooking station configured to employ pellets as a fuel source for cooking and configured to initially ignite the pellets with a gas fuel is provided. The cooking station includes a main body, a pellet feeding portion, a gas line, a mixing structure, and one or more screens. The main body extends to define a cooking portion and a heating portion, the cooking portion positioned above the heating portion. The pellet feeding portion is associated with the heating portion, the pellet feeding portion including a hopper and a pellet feeder. The hopper is sized and configured to hold the pellets therein with a lower opening sized to funnel the pellets therethrough, the pellet feeder positioned adjacent the lower opening and configured to move the pellets from the lower opening toward the heating portion. The fire pot is positioned within the heating portion of the main body, the fire pot positioned to receive the pellets from the pellet feeder. The gas line is configured to feed gas to the fire pot, the gas line including an end tube portion. The end tube portion includes an air hole defined therein, the end tube portion having an end positioned to disperse gas within the fire pot. The mixing structure is positioned between the air hole and the end of the end tube portion, the mixing structure sized and configured to mix oxygen and the gas fuel together. The one or more screens is coupled to an interior of the fire pot such that the one or more screens extend to define a region within the interior of the fire pot, the one or more screens being sized and configured to block the pellets from the region.

In another embodiment, the mixing structure includes curved fins sized and configured to swirl the oxygen and the gas together. In still another embodiment, the mixing structure includes the one or more metal screens positioned within the fire pot, the one or more screens extending over the end of the end tube portion. In another embodiment, the pellet feeder and the gas line are electrically coupled to a controller, the controller configured to control an amount of pellets provided to the fire pot and configured to control dispersal of the gas through the gas line, the controller being powered through at least one of a power cord and a battery.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figures 1, 2:
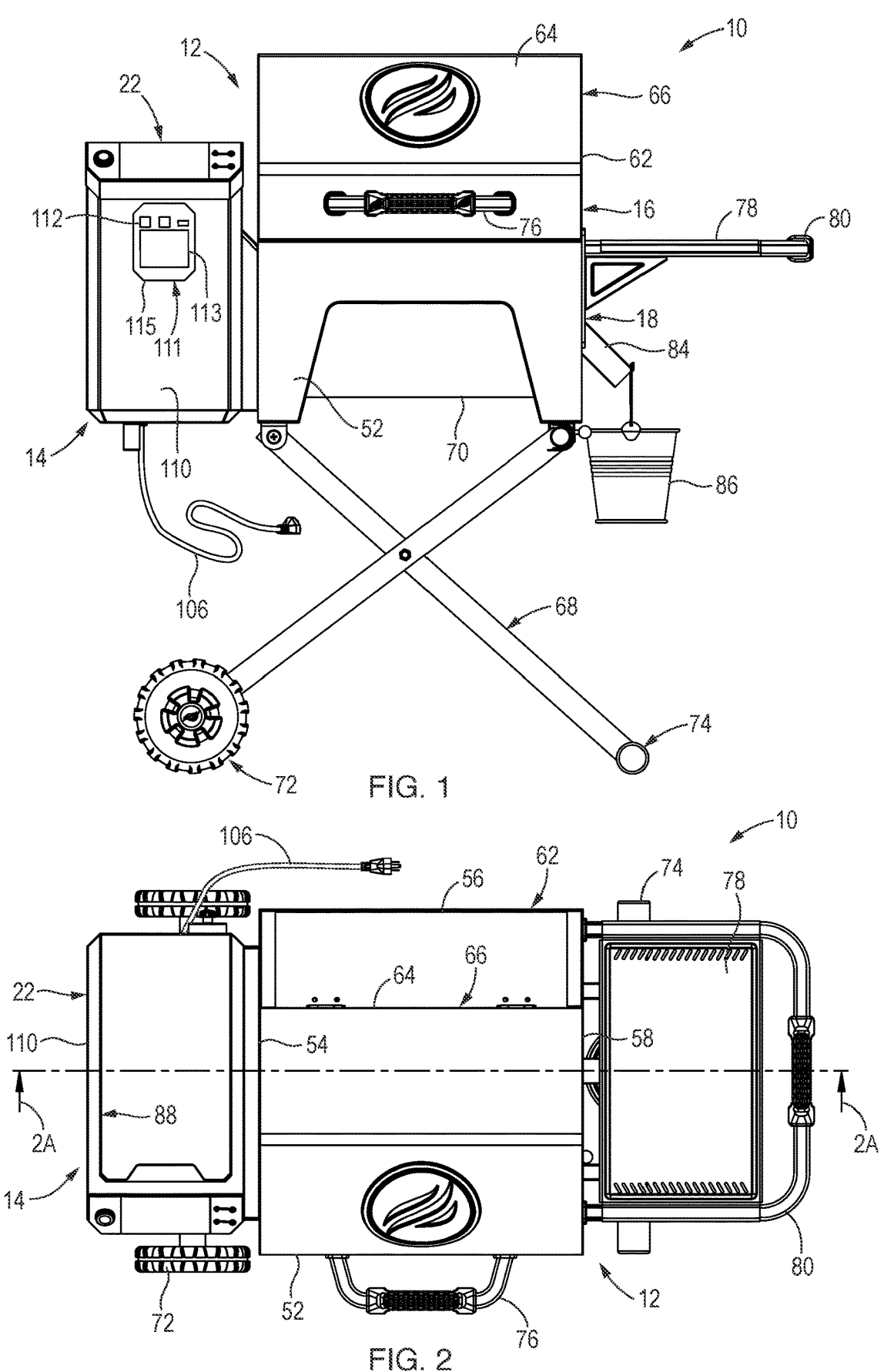
FIG. 1 is a front view of a pellet smoker type cooking system, according to an embodiment of the present invention.
FIG. 2 is a top view of the pellet smoker type cooking system, according to another embodiment of the present invention.

Referring to FIGS. 1, 2A, 4, 5 and 8, a cooking system 10 or outdoor cooking station including a main body 12 and a pellet feeding portion 14 is provided. Such main body 12 may extend to define a cooking portion 16 and a heating portion 18. The cooking portion 16 may include a cooking surface 20 such that the heating portion 18 may be positioned below the cooking surface 20. The pellet feeding portion 14 may be positioned such that the pellet feeding portion 14 is associated with the heating portion 18 of the main body 12. The pellet feeding portion 14 may include a hopper 22 and a pellet feeder 24. The hopper 22 may be sized and configured to hold pellets 21. Further, the hopper 22 may extend to define a lower opening 26 such that the pellets 21 may be funneled to the pellet feeder 24. The pellet feeder 24 may be sized and configured to initiate the movement of pellets 21 to a fire pot 28. The fire pot 28 may extend to define an interior surface 30. The interior surface 30 may define a feeder opening 32 and a gas line opening 34. A gas line 36 may be aligned with the gas line opening 34. The feeder opening 32 may be sized and configured to allow the pellets 21 to move from the pellet feeder 24 into the fire pot 28. Further, the fire pot 28 may include one or more metal screens 38 defining a region 40 so that the pellets 21 are unable to enter within the region 40. The gas line 36 may include an end tube 42 in which an end 44 of the end tube 42 is positioned to disperse gas within the fire pot 28. Further, the one or more metal screens 38 may include multiple holes 46 to allow for gas and oxygen to flow and disperse within the fire pot 28. The end tube 42 may include an air hole 48 and a mixing structure 50 (FIG. 6B) such that the air hole 48 may allow for oxygen to be drawn through the end tube 42 and toward the fire pot 28. With this arrangement, the pellets 21 may be moved to the fire pot 28 to be ignited by combusting or igniting gas fuel with the pellets 21.

Figure 8:
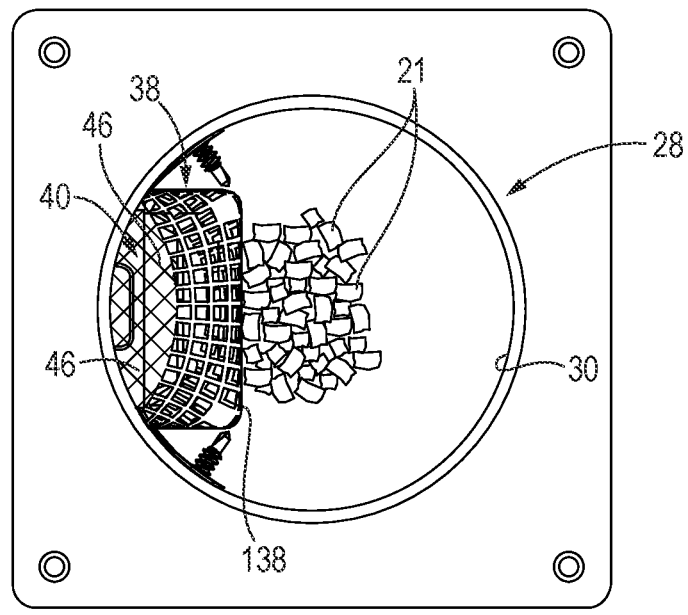
FIG. 8 is a top view of the fire pot with the one or more screens disposed within the fire pot, according to another embodiment of the present invention.
Figure 9:
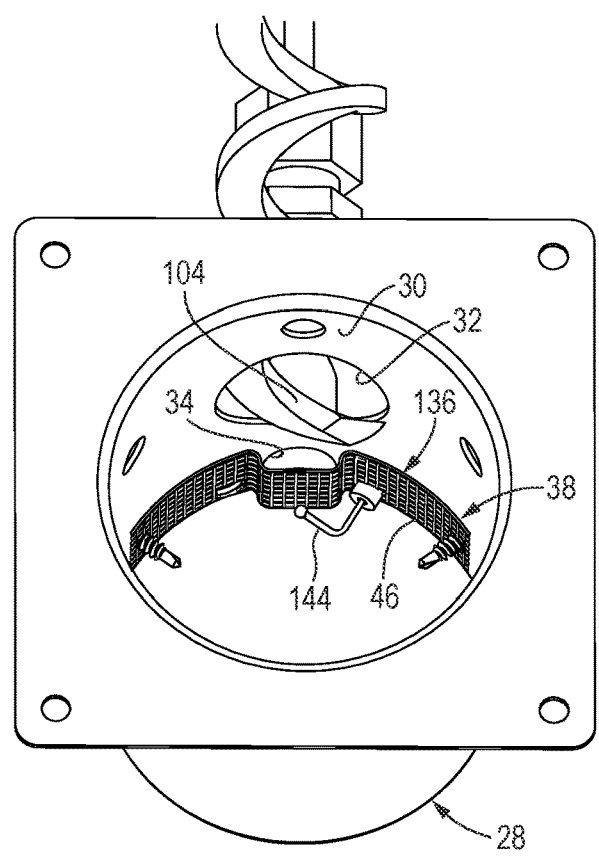
FIG. 9 is a top perspective view of the fire pot in a partially assembled form, depicting a first screen of the one or more screens positioned over an end of the gas line, according to another embodiment of the present invention.
Figure 10:
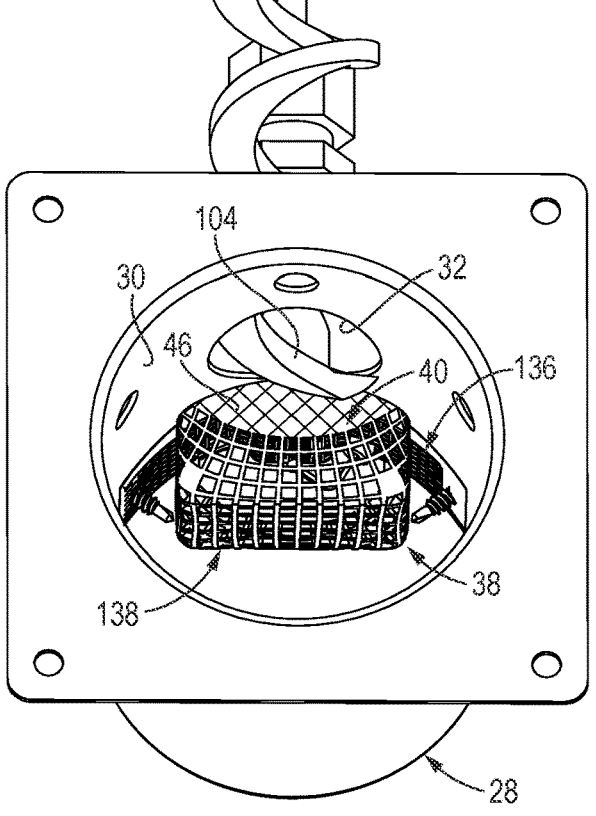
FIG. 10 is a top perspective view of the fire pot, depicting the first screen and a second screen positioned in the fire pot, according to another embodiment of the present invention.

The pellets 21 referenced here, and shown in the fire pot 28 in FIG. 8, may be made specifically as a fuel for cooking food. Such pellets 21 for cooking are typically made from hardwood, such as apple, cherry, hickory, oak and/or alder wood, each of which may impart a unique flavor to the food being cooked with the pellets as the fuel. As such, the pellets 21 may also be referenced as cooking pellets, grilling pellets, or smoking pellets, as opposed to other types of pellets made for heating stoves (which are typically made from a softwood). Further, the pellets 21 are processed from trees, lumber scrap, and sawdust, which may each be broken down to minimized shavings and sawdust, and further processed by compressing the broken down wood and removing the moisture from the wood, as known to one of ordinary skill in the art. The result from such processing are substantially uniform shaped cylindrical pellets (about the diameter of a pencil), the pellets 21 being sized and configured to be employed with the cooking system 10 described herein.

Figure 2A:
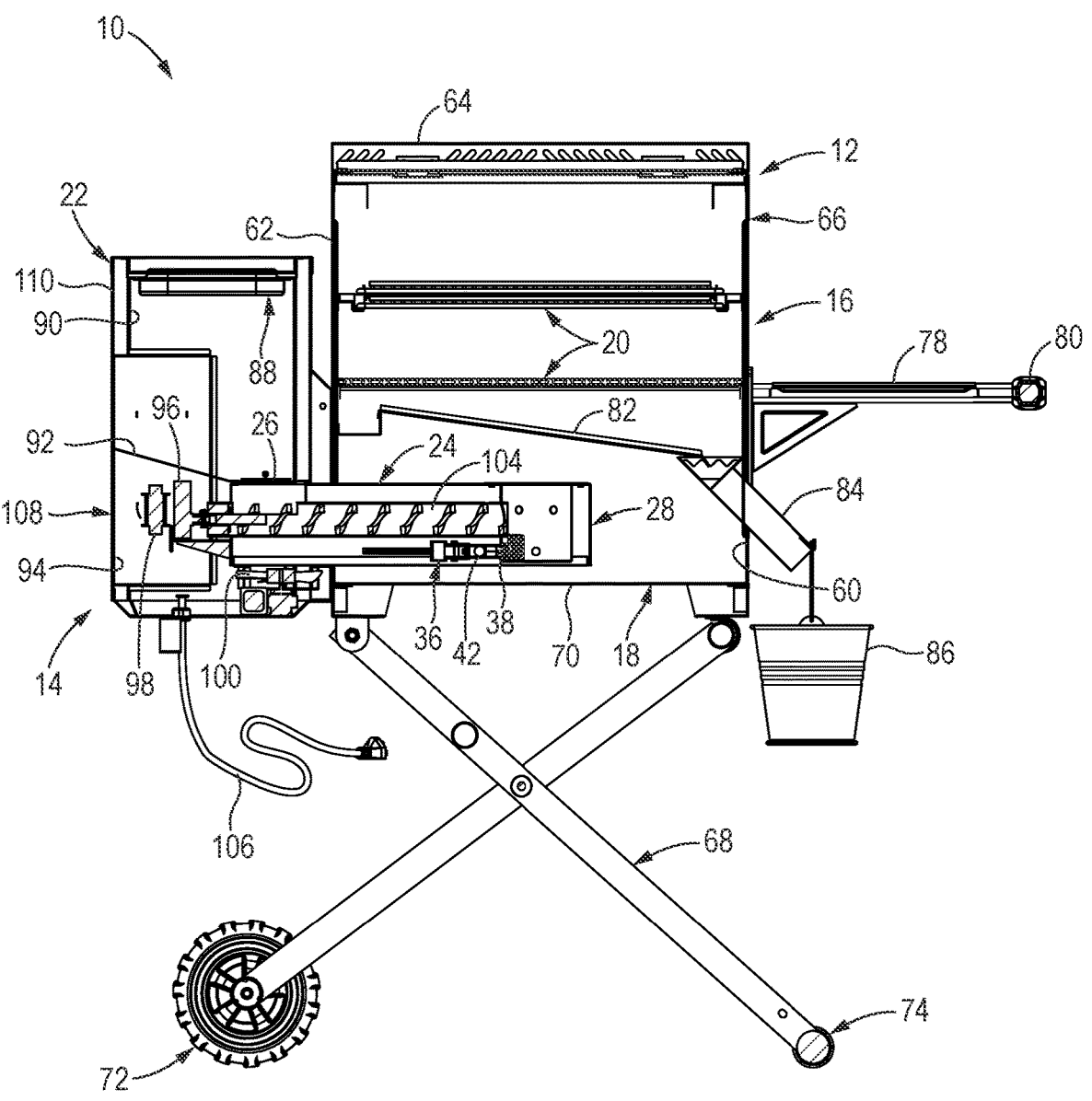
FIG. 2A is a cross-sectional side view of the pellet smoker type cooking system taken along section line 2A-2A in FIG. 2, according to an embodiment of the present invention.

With reference to FIGS. 1, 2 and 2A, the cooking system 10 may include the main body 12 in which a front wall 52, a left wall 54, a rear wall 56 and a right wall 58 are defined. The front, left, rear and right walls 52, 54, 56, 58 may extend upwards to define an inner surface 60 and outer surface 62. Further, the front, left, rear and right walls 52, 54, 56, 58 may extend upwards to define a dome shape 64. The dome shape 64 may be hinged on the rear wall 56 to define a pivoting lid 66. In some embodiments, the lid 66 may also be hinged on any of the left, rear and right walls 54, 56, 58 of the main body 12. In another embodiment, the dome shape 64 may extend with other shapes such as a rectangular shape or flat shape to form the lid 66. The lid 66 may include multiple vents to allow for ventilation within the main body 12. The main body 12 may include legs 68 extending from and located at a lower side 70 of the main body 12 and attached to the left and right walls 54, 58. The legs 68 may be configured such that opposing legs 68 may cross to form an x-configuration. The legs 68 may also be provided in other configurations such as four legs extending downwards from the main body 12 to support the main body. Further, the legs 68 may include a wheel set 72 such that the cooking system 10 may become moveable and, thus, readily portable. The wheel set 72 may be located on the legs 68 extending from either the lower side 70 of the left or right wall 54, 58 such that the opposing legs 68 to the wheel set 72 legs 68 may be configured to rest on a flat surface to act as a brake 74. In another embodiment, the cooking station 10 may include four vertically extending legs with wheels of which some of the wheels may include a braking function therein. The main body 12 may include a lid handle 76 such that the lid 66 may be lifted to reveal the inner surface 60 or lowered to cover and contain heat within the main body 12. Further, the main body 12 may include a side shelf 78 which may contain a side handle 80. The side shelf 78 may be located on the opposing side of the main body 12 of which the pellet feeding portion 14 is located. Further, the side handle 80 and side shelf 78 may be configured to be on the opposing side of the wheel set 72 such that the user may lift and move the cooking system 10 by the side handle 80. The front, left, rear and right walls 52, 54, 56, 58 may extend downwards to the lower side 70 which may extend such that the pellet feeder 24 is encased within the main body 12. Further, the main body 12 may include and employ various structural and functional components including alternative embodiments, as known to one of ordinary skill in the art, that may be employed with the cooking system for igniting pellets 21 (FIG. 8) with a gas fuel.

The inner surface 60 of the main body 12 may extend to define the cooking portion 16 and the heating portion 18. The cooking portion 16 may include the cooking surface 20 which may extend to the front, left, rear and right walls 52, 54, 56, 58 of the main body 12. The cooking surface 20 may be configured to have grates or a grill structure to allow for a food product to be cooked thereon by a heat source. A grease trough 82 may be located below the cooking surface 20 and extend to correspond with the cooking surface 20. The grease trough 82 may be angled to allow for grease to be gravity fed to a grease funnel 84. The grease funnel 84 may allow for grease to collect and funnel towards a grease bucket 86 located below the side shelf 78. Further, the grease bucket 86 may be located on the left or right wall 54, 58 such that the grease trough 82 and grease funnel 84 correspond and facilitate the movement of grease towards the grease bucket 86.

Figure 3:
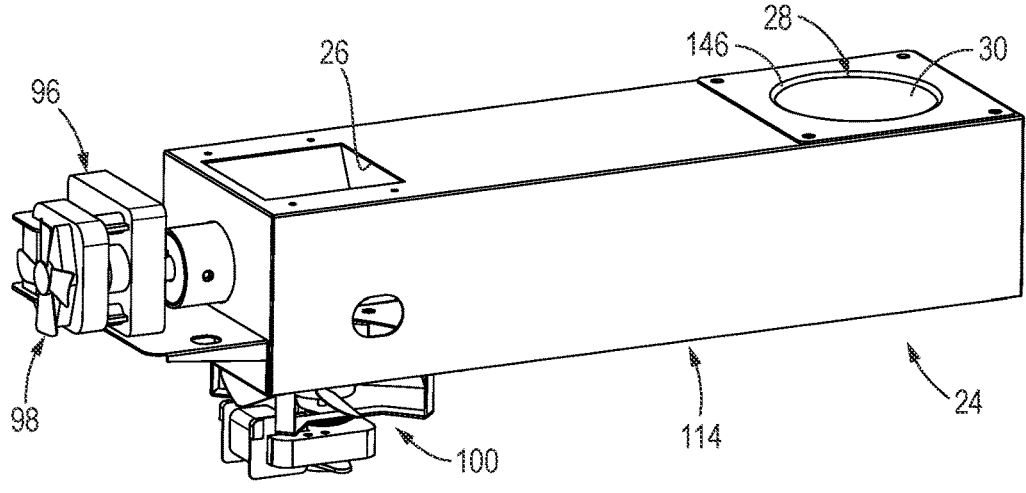
FIG. 3 is a perspective view of a pellet feeder, according to another embodiment of the present invention.
Figure 4:
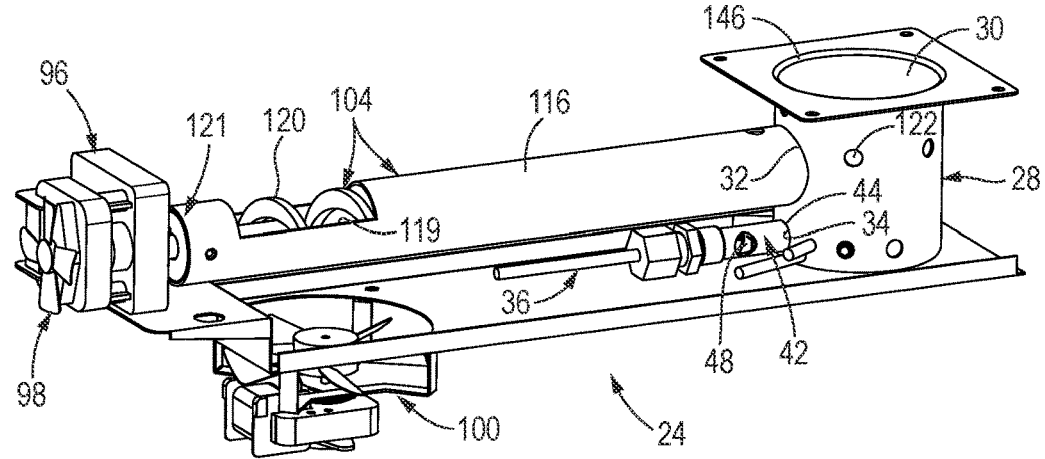
FIG. 4 is a perspective view of a partial assembly of the pellet feeder focused on a feeder housing, according to another embodiment of the present invention.
Figure 5:
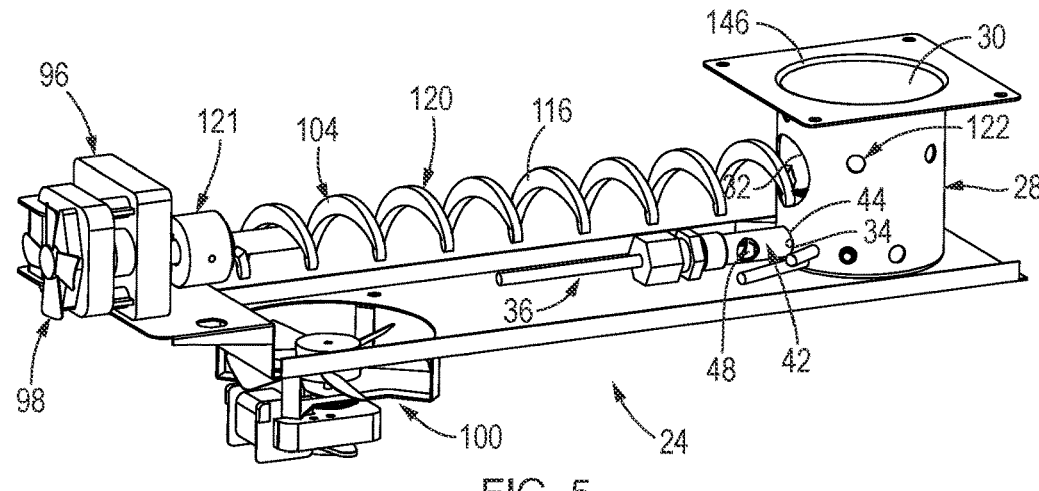
FIG. 5 is a perspective view of a partial assembly of the pellet feeder focused on a feeder, according to another embodiment of the present invention.

The pellet feeding portion 14 may be attached to the main body 12 such that pellets 21 (FIG. 8) may be fed into the heating portion 18 of the main body 12. The pellet feeding portion 14 may include a hopper 22 and pellet feeder 24. The hopper 22 may be sized and configured to be attached to the left, rear or right wall 54, 56, 58 of the main body 12. Further, the hopper 22 may include an inlet 88 such that the pellets can be poured or dumped into an interior 90 of the hopper 22. The inlet 88 may include a cover to close off the interior 90 of the hopper 22. The interior 90 of the hopper 22 may extend downwards such that a sloped floor 92 is defined to funnel the pellets towards a lower opening 26 (see also FIG. 3). Further, the interior 90 of the hopper 22 may define a mechanical space 94 located below the sloped floor 92 such that mechanical or electrical components may be protected from the pellets. The hopper 22 may include and employ various mechanical and electrical components, as known to one of ordinary skill of the art, so that the hopper 22 and other components of the cooking system 10 may function appropriately. The mechanical space 94 may include an upper motor 96, upper fan 98 and a lower fan 100. The lower fan 100 may be positioned beneath the lower opening 26 (FIG. 3) to the pellet feeder 24 such that the lower fan 100 may manipulate air to enter the pellet feeder 24. The upper motor 96 and the upper fan 98 may be positioned to be in-line with each other and attached to a feeder 104 located within the pellet feeder 24. The upper motor 96 may be sized and configured to rotate and move a feeder 104 to facilitate the movement of the pellets towards the fire pot 28 by the means of turning or pushing the pellets. For example, the feeder 104 may have an auger structure for advancing the pellets to the fire pot 28. Further, the upper fan 98 may cool the upper motor 96 and manipulate air to enter the pellet feeder 24. The mechanical space 94 may include various electrical components such as a plug 106 or battery 222 (FIG. 11), or components associated with the plug 106 or battery, which may be used to power the cooking system 10. Further, in another embodiment, some of the electrical components may be contained within an electrical box 108 located within the hopper 22. Further, an exterior 110 of the hopper 22, for example, may include a control portion 111 with one or more input buttons 112, a display 113, and temperature sensors (not shown) linked to the control portion 111 as well as an integrated controller 115 for controlling the various mechanical and electrical components and corresponding functionality of the cooking system 10 (see FIG. 1), as known to one of ordinary skill in the art. Further, the pellet feeding portion 14 and control portion 111 set forth herein (as well as other portions of the cooking system 10) may incorporate various features and embodiments described and depicted in commonly assigned U.S. patent application Ser. No. 17/337,310, filed Jun. 2, 2021, entitled "OUTDOOR COOKING STATION FOR SMOKING FOOD AND METHOD THEREOF," and U.S. patent application Ser. No. 17/385,881, filed Jul. 26, 2021, entitled "OUTDOOR COOKING STATION FOR SMOKING FOOD AND METHOD THEREOF," the disclosures of which are incorporated herein by reference in their entirety.

Now with reference to FIGS. 2A, 3, 4 and 5, the sloped floor 92 and the lower opening 26 may facilitate the pellets to move into the pellet feeder 24 via gravity. The pellet feeder 24 may extend from the hopper 22 to the heating portion 18 of the main body 12. The upper fan 98, upper motor 96, and lower fan 100 may be attached to the pellet feeder 24. Further, the pellet feeder 24 may include a pellet feeder housing 114, the feeder 104 and the gas line 36. The pellet feeder housing 114 of the pellet feeder 24 may extend to encase a feeder housing 116, the feeder 104, the gas line 36 and the fire pot 28 such that the housing 114 defines an air space 118 (FIG. 6A) therein. The air space 118 (FIG. 6A) may allow for air flow within the pellet feeder housing 114 from the upper fan 98 and the lower fan 100. The fire pot 28 may include multiple air inlets 122 such that the upper fan 98 and lower fan 100 may push air towards the fire pot 28 and through the air inlets 122 to fan the ignited pellets. Further, the air inlets 122 may allow for air to enter the interior surface 30 of the fire pot 28 such that the pellets may receive additional oxygen to burn hotter. Further, the fire pot 28 may define a heat opening 146 along a top side of the fire pot to channel heat upward from the fire pot 28 toward the cooking portion 16.

Figure 13:
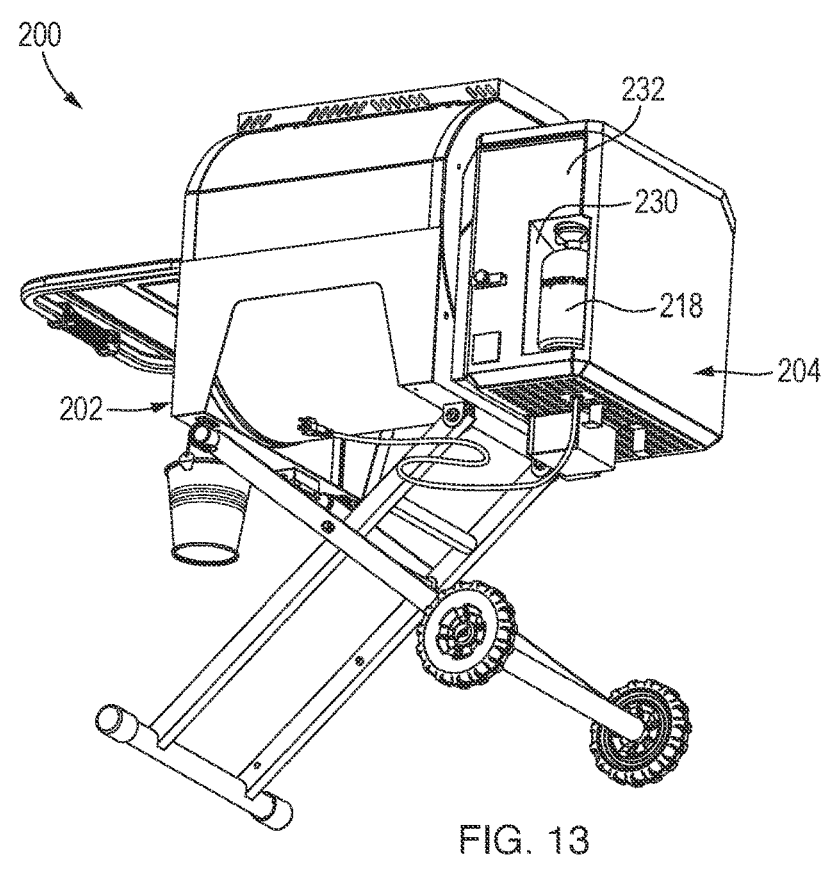
FIG. 13 is a rear perspective view of the cooking system of FIG. 11, depicting the cooking system being coupled to a propane tank, according to another embodiment of the present invention.

The feeder housing 116 may define a feeder inlet 119 such that the feeder housing 116 may be positioned below the lower opening 26 to facilitate the pellets move from the lower opening 26 into the feeder housing 116. Further, the feeder housing 116 may encase the feeder 104 and extend towards the feeder opening 32 of the fire pot 28. The upper motor 96 and upper fan 98 may be positioned and attached to one end portion 121 (or proximal end portion) of the feeder 104. The one end portion 121 of the feeder 104 may extend outside of the pellet feeder housing 114 into the mechanical space 94. The feeder 104 may include an auger structure 120 or helical structure extending within the feeder housing 116. As such, the auger structure 120 may be rotated by the upper motor 96 such that pellets are moved to the fire pot 28 along the space defined between the auger structure and an inner surface of the feeder housing 116. In another embodiment, the feeder 104 may include other configurations such as a flat surface or a rotating paddle wheel to push pellets towards the fire pot 28. The gas line 36 may be positioned below the feeder housing 114 and include the end tube 42. One end 44 of the end tube 42 may extend to the gas line opening 34 of the fire pot 28 to allow gas to flow into the fire pot 28. The fire pot 28 may include air inlets 122 to allow for air from the upper fan 98 and lower fan 100 to move into the fire pot 28. Further, the other end of the gas line 36 (opposite of end 44) may extend with additional structural components, such as tubing that may extend between the other end of gas line 36 and a propane tank 218 (FIG. 13). As such, the tubing may extend from or be coupled to the gas line 36 to facilitate providing propane or natural gas to the fire pot 28, as known to one of ordinary skill in the art.

Figure 6:
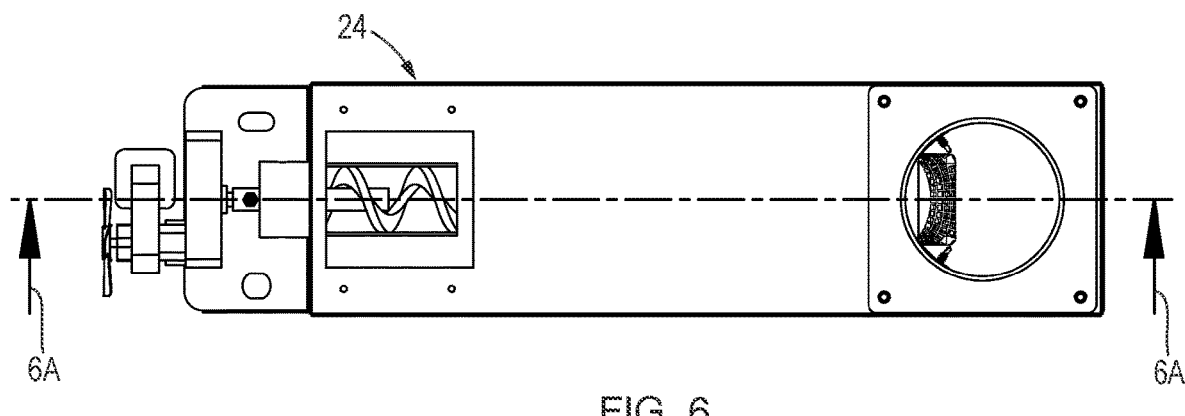
FIG. 6 is a top view of the pellet feeder, according to another embodiment of the present invention.
Figure 6A:
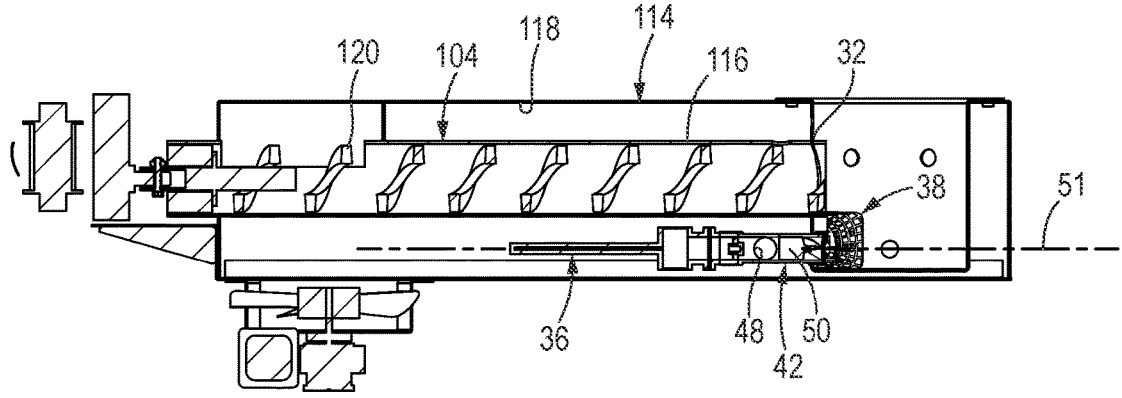
FIG. 6A is a cross-sectional view of the pellet feeder taken along section line 6A-6A in FIG. 6, according to an embodiment of the present invention.
Figure 6B:
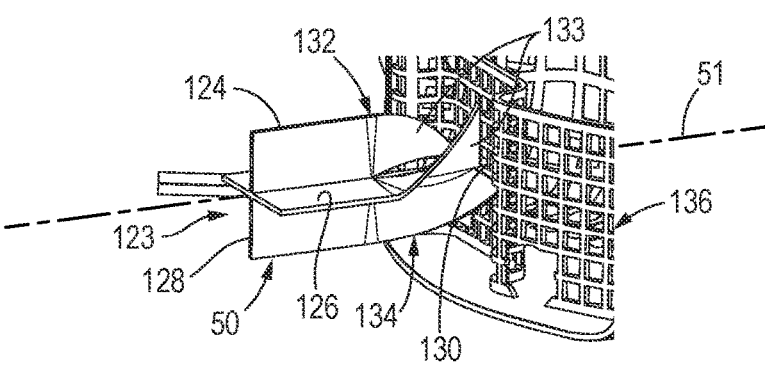
FIG. 6B is an enlarged rear perspective view of gas mixing structure and a portion of a fire pot with one or more screens, depicting the gas mixing structure without its housing, according to an embodiment of the present invention.

Now with reference to FIGS. 6, 6A and 6B, the end tube 42 of the gas line 36 may include the mixing structure 50 positioned therein. Such mixing structure 50 may be positioned between the end 44 of the end tube 42 and the air hole 48. Such air hole 48 may include opposing air holes defined in the wall of the end tube 42 such that the opposing air holes are aligned relative to each other to define an air hole axis extending orthogonal to a tube axis 51, the tube axis 51 extending longitudinally with and along the end tube 42. Adjacent the air hole 48, the mixing structure 50 may extend to define a cross structure or t-structure 123 that may extend with, for example, a vertical component 124 and horizontal component 126. In another embodiment, the t-structure may be oriented to exhibit an x-structure. In another embodiment, such t-structure or x-structure may extend symmetrically or, in another embodiment, in a non-symmetrical manner. The vertical and horizontal components 124, 126 may be positioned and configured to intersect at a central point or axis to form the t-structure. Further, the vertical and horizontal components 124, 126 may have a first end 128 and a second end 130 where the first end 128 may extend towards the second end 130 along the axis 51 of the end tube 42, the second end 130 positioned adjacent to the end 44 of the end tube 42. The vertical and horizontal components 124, 126 may extend longitudinally toward the second end with flat surfaces to a mid-way transition 132 where the vertical and horizontal components 124, 126 transition to curved portions 133 or curved fins so as to resemble a propeller configuration 134. Such curved fins may be sized and configured to advance the gas into the fire pot 28 so that the gas flow moves radially or generates some turbulence in its gas flow. In another embodiment the mixing structure 50 may extend in multiple configurations such as a windmill configuration being in both the first end 128 and second end 130 such that the first end 128 and second end 130 are at least partially off center or mis-aligned. With this arrangement, as the upper and lower fans provide air flow within housing 114, the air may be drawn through the air hole 48 of the end tube 42 to move through the end tube 42 toward the end 44 thereof. In this manner, the mixing structure 50 may allow for air from the air hole 48 and the gas being advanced through the gas line 36 to blend and create a mixture which may more readily combust and burn hotter.

With reference to FIGS. 7-10, the fire pot 28 may be included in the housing 114 of the pellet feeder 24 (FIG. 3) such that the fire pot 28 is located in the heating portion 18 of the main body 12 (see FIG. 2A). The fire pot 28 may include the feeder opening 32 such that pellets 21 are fed by the feeder 104 to the interior surface 30 of the fire pot 28. Further, the fire pot 28 may include the gas line opening 34 such that the end 44 of the gas line 36 and the end tube 42 may disperse gas within the fire pot 28 (see FIG. 5). The fire pot 28 may have one or more metal screens 38 which may be positioned to define the region 40 (shown generally with dashed lines in FIG. 7) within the fire pot 28. In one embodiment, the one or more metal screens 38 may include a back screen 136 (see also FIG. 6B) and a front screen 138, the back and front screens 136, 138 both extending to define the region 40 within the fire pot 28. The back screen 136 may be referenced as a first screen and the front screen 138 may be referenced as a second screen. Further, the one or more metal screens 38 may include multiple holes 46 defined therein, the multiple holes 46 or a multi-cellular structure sized and configured to block pellets 21 from moving within the region 40. The gas line opening 34 may be defined in an interior surface of the fire pot 28 such that the back screen 136 may be placed over the gas line opening 34 and along the interior surface of the fire pot 28 to substantially ensure pellets 21 are prevented from inadvertently moving into the gas line 34 and/or within the region 40. In another embodiment, the multiple holes 46 defined in the one or more screens 38 may be sized and configured to readily facilitate gas flow therethrough as well as between the pellets 21 piled upon each other within the fire pot 28. Further, in another embodiment, the back screen 136 or first screen may act as a mixing structure so as to cause turbulence in the gas flow. Such turbulence may result in further blending and mixing gas with oxygen in the fire pot 28. In another embodiment, the mixing structure may be a screen associated with the gas line 36, such as the back screen 136 or a screen positioned within a tube of the gas line 36. In another embodiment, the multiple holes 46 may be defined in the back and front screens 136, 138 in a manner to allow for the gas to be dispersed all around the pellets 21 and within the fire pot 28 without disruption so that as the gas is ignited, the pellets 21 also become ignited. Furthermore, as the gas ignites so that the pellets 21 become ignited, the heat from the gas and pellets 21 may cause the front screen 138 or second screen to visually become red-hot such that the one or more screens 38 may also act to assist in keeping the pellets 21 burning.

Figure 7:
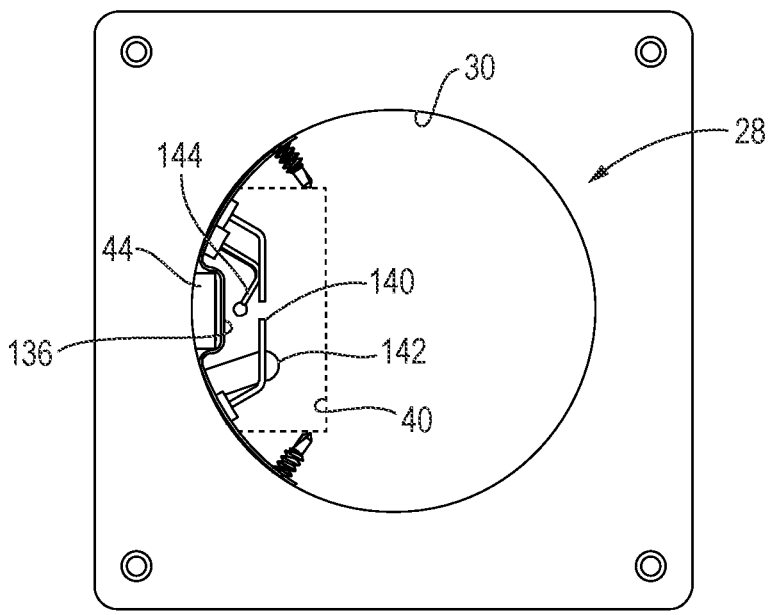
FIG. 7 is a top view of a portion of a fire pot, depicting the fire pot without the one or more screens, according to another embodiment of the present invention.

As previously set forth, the one or more screens 38, such as the back and front screens 136, 138, may be positioned within the fire pot 28 to extend to define the region 40 within the fire pot 28. As best shown in FIG. 7, such region 40 may include various components therein to monitor and control the burning of the pellets 21 and the gas flow, such as a spark ignitor 140, a thermocouple 142, and a flame sensor 144. The spark ignitor 140 may extend at least partially within the region 40 and be configured to ignite the gas feeding through the gas line 36 (FIG. 6A) subsequent to being mixed by the mixing structure 50. The thermocouple 142 may extend at least partially within the region 40 such that the temperature within the fire pot 28 may be monitored. As the temperature is being monitored with the thermocouple 142, the upper and/or lower fans 98, 100 (see FIG. 3) may provide air flow into the fire pot 28 so that as the pellets 21 ignite, the air flow moving against the ignited pellets 21 results in the pellets 21 being fanned to burn faster and hotter. Further, the thermocouple 142 may be configured to shut off the gas line 36 with the controller 115, upon a predetermined temperature being sensed by the thermocouple 142 within the fire pot 28. The flame sensor 144 may extend at least partially within the region 40 and may be configured to sense if the gas has been ignited to generate a flame. If a flame is not sensed by the flame sensor 144 for a certain time period subsequent to the spark ignitor 140 generating one or more sparks, then the controller 115 may shut off the gas line 36. At this point, the lower fan 100 may clear out the gas in the fire pot 28. Once the gas is cleared out, the gas line 36 may be opened to feed gas to the fire pot 28 to then be ignited to generate a flame for initially igniting the pellets 21. Further, the one or more metal screens 38 may be sized and configured to protect the spark ignitor 140, thermocouple 142 and flame sensor 144 from the burning pellets 21.

With reference to FIGS. 2A, 6A, 6B, 9 and 10, as previously set forth, the cooking system 10 includes various components to facilitate initially igniting pellets with gas fuel to obtain optimal cooking temperatures in a short time period, as opposed to the more traditional mode for igniting the pellets. In one embodiment, the gas fuel advances through the gas line 36 and end tube 42 at a high velocity, which draws air or oxygen through the air holes 48 defined in the end tube 42 so that oxygen begins mixing with the gas fuel. The gas fuel and air continue to further mix as the mixture passes over curved fins 133 of the mixing structure 50 to rotate the mixture in the end tube 42 in a radial manner. Additional mixing of the gas fuel and air occur as the mixture passes through the first screen 136 extending over the end 44 of the end tube 42, resulting in turbulent flow of the gas mixture. After the gas mixture passes the first screen 136, the gas mixture is ignited within the region 40 defined by the first and second screens 136, 138. As the gas mixture is combusted, the flames will pass through the second screen 138 to ignite the pellets. After a few seconds of combustion, the second screen 138 will heat up to a cherry red color and act as a catalyst to burn the gas mixture even faster, at which point the flames will pull back to just about the second screen 138 and continue in a steady state mode. This steady state will continue until the gas is turned off. In this manner, the pellets can be efficiently ignited so that the pellets may burn at a level to achieve optimal cooking temperatures in a short period of time.

Figure 11:
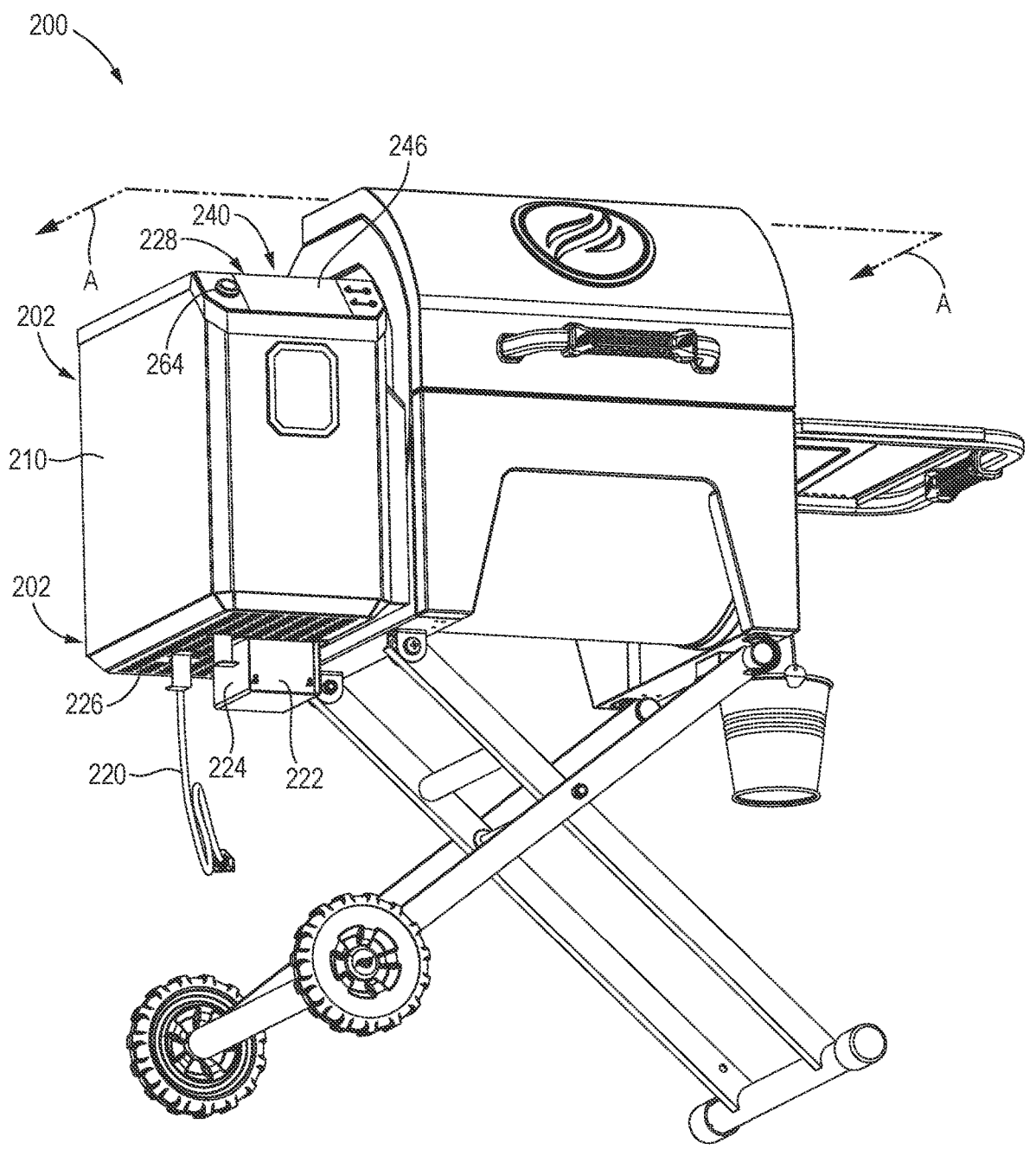
FIG. 11 is a front perspective view of another embodiment of a cooking system, depicting the cooking system having a battery positioned therewith, according to the present invention.
Figure 12:
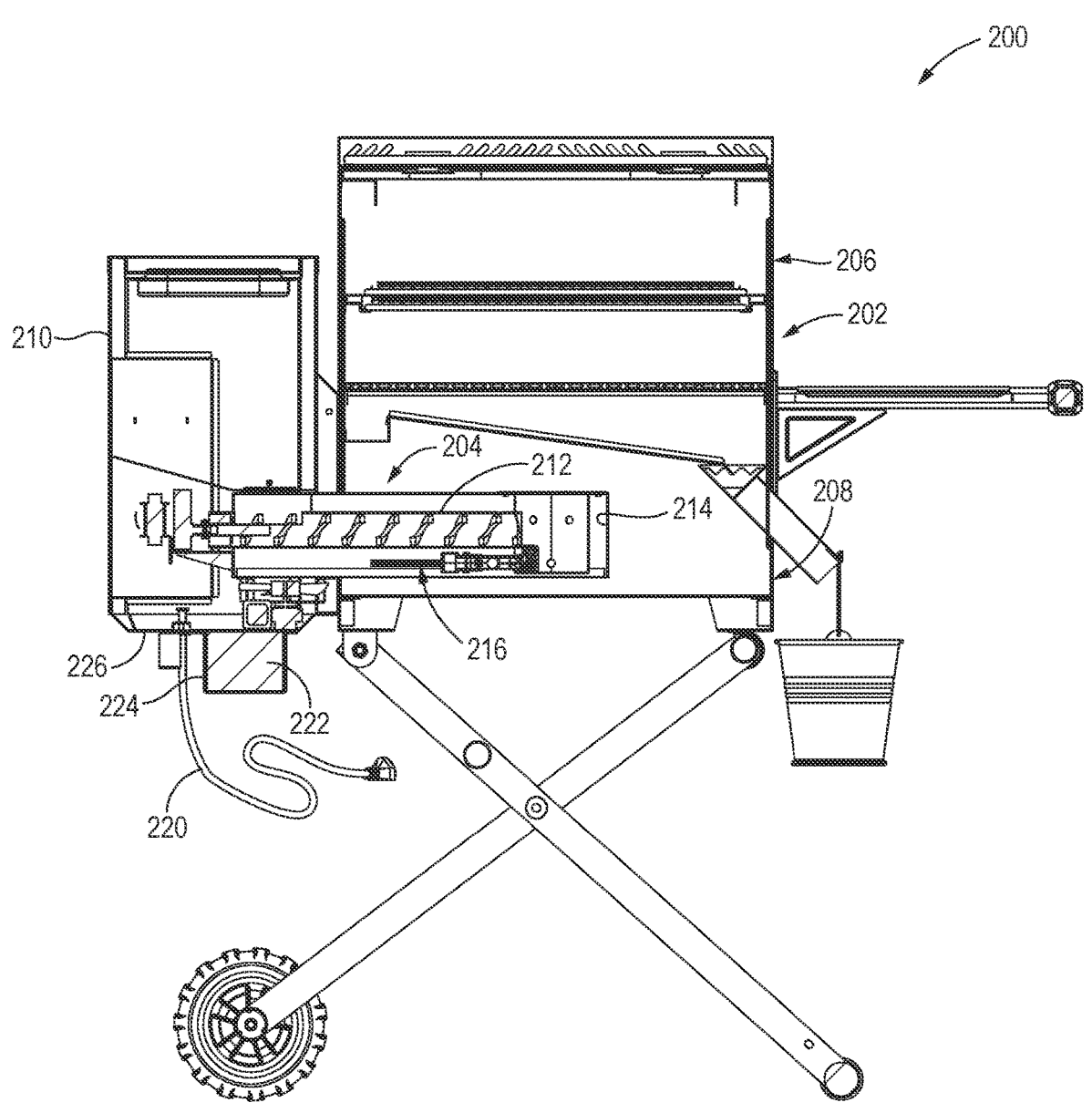
FIG. 12 is a cross-sectional view of the cooking system taken along section line A-A in FIG. 11, according to another embodiment of the present invention.

Now with reference to FIGS. 11-12, another embodiment of a cooking system 200 or cooking station sized and configured to employ pellets 21 (FIG. 8) as a fuel source for cooking, and that can initially ignite such pellets with a gas fuel, is provided. This cooking system 200 may be substantially similar to the previous embodiments set forth herein. For example, the cooking system 200 may include a main body 202 with a pellet feeding portion 204, the main body 202 extending to define a cooking portion 206 and a heating portion 208 such that the heating portion 208 is positioned below the cooking portion 206. Further, the pellet feeding portion 204 may include a hopper 210 and a pellet feeder 212, the pellet feeder 212 configured to feed pellets from the hopper 210 to the heating portion 208 and, specifically, feed pellets to a fire pot 214 positioned within the heating portion 208 of the main body 202. Such fire pot 214 may be employed similarly and include all the components of the previous embodiment described herein. Furthermore, the cooking station may include a gas line portion 216 coupled to a propane tank 218 (FIG. 13), the gas line portion sized and configured to feed gas to the fire pot 214 for igniting the pellets in the fire pot 214, similar to that previously described herein. The other components of the cooking system 200 may also be similar to that previously described for the cooking system 200, except in this embodiment, the cooking system 200 may be powered with a power cord 220 (upon being plugged into a power outlet) and/or a rechargeable battery 222.

The rechargeable battery 222 may be positioned within a tray 224 along an underside 226 of the hopper 210 and may be operably coupled to a control panel 228 of the cooking system 200. Although the battery 222 may be removed from the tray 224, it may be intended for the battery 222 to remain within the tray 224 since the battery 222 may be recharged while positioned within the tray 224. With the battery 222 positioned within the tray 224, the battery 222 may power the components of the cooking system 200 as well as be recharged, upon the power cord 220 being plugged in a power outlet (not shown). The tray 224, or components associated with the tray 224, may include contact points sized and configured to electrically connect the battery 222 to the control panel 228 so that the battery 222 may be operably coupled to the electrical components of the cooking system 200, as known to one of ordinary skill in the art. The charged status of the battery 222 may be viewed on the control panel 228 of the cooking system 200. The battery 222 may be a lithium-based type battery, or any other type of rechargeable battery, as known to one of ordinary skill in the art.

Figure 14:
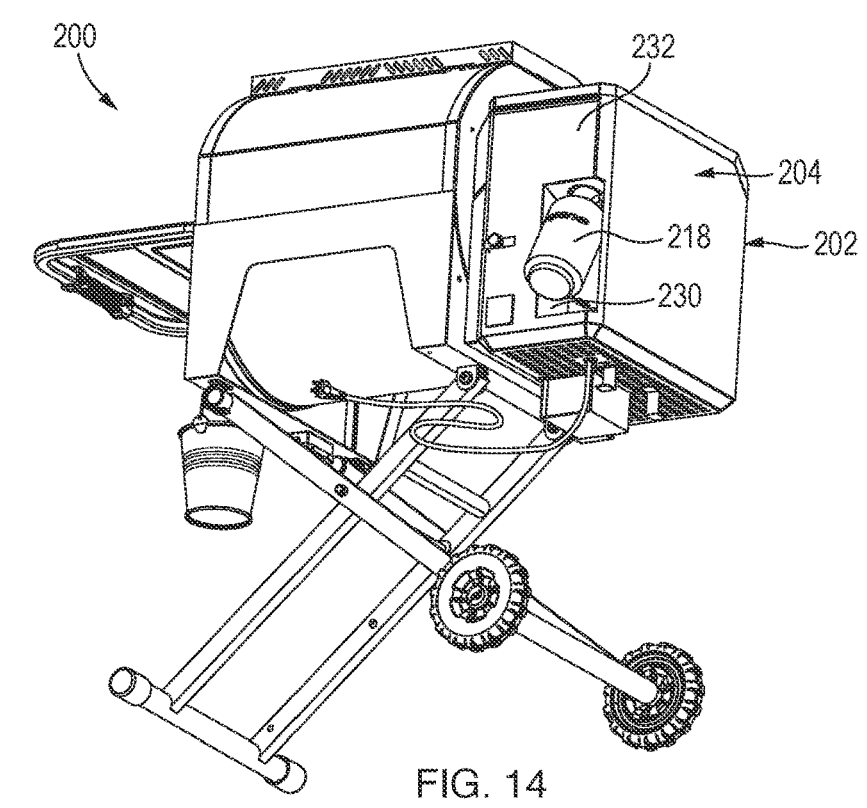
FIG. 14 is a rear perspective view of the cooking system, depicting the propane tank moved to another orientation for de-coupling the propane tank, according to another embodiment of the present invention.

With reference to FIGS. 12, 13, and 14, as previously set forth, the pellets of the cooking system 200 may be advanced to the fire pot 214 with the pellet feeder 212 to be ignited by gas fuel funneled to the fire pot 214 from the propane tank 218. The propane tank 218 may be positioned within a recessed portion 230 defined along a rear side 232 of the pellet feeder portion 204 of the cooking system 200. In one embodiment, the propane tank 218 may be moved between a first position and a second position. In the first position, as depicted in FIG. 13, the propane tank 218 may be positioned in a vertical upright manner within the recessed portion 230 of the main body 202. In another embodiment, the propone tank 218 may be positioned in a horizontal position while being in the first position. Further, in the first position, the propane tank 218 may be in a use position such that gas may be releasable from the propane tank 218 to be advanced to the fire pot 214, as desired by the user and controlled by the user at the control panel 228 (FIG. 11) or other manual type controls. In the second position, the propane tank 218 may be manually moved to an angled orientation, as shown in FIG. 14. In the second position, gas may not be releasable from the propane tank 218. Further, in the second position, the propane tank 218 may be de-coupled from a propane tank coupling (not shown) so that the propane tank 218 may be removed from the recessed portion 230 of the cooking system 200. As such, upon the propane tank 218 being moved from the first position to the second position so that the propane tank 218 is oriented at the angled orientation, the propane tank 218 may be rotat-ably de-coupled from the cooking station 200. Similarly, upon coupling a new or the same propane tank 218 to the cooking system 200 by rotating the propane tank 218 onto the propane tank coupling, the propane tank 218 can be moved from the second position to the first position so that gas may be employed with the cooking system 200 to ignite pellets in the fire pot 214, as described herein.

Figure 15:
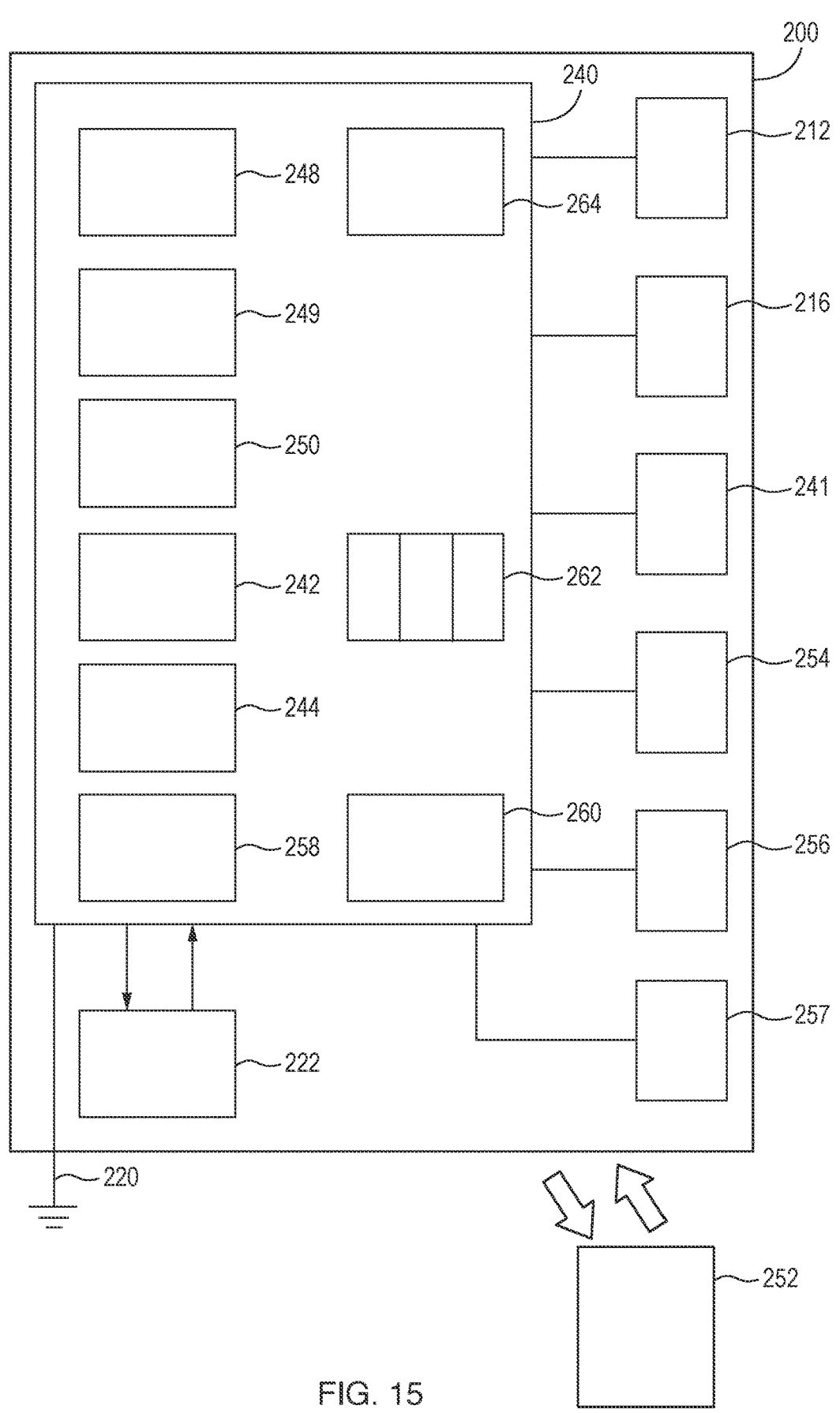
FIG. 15 is a schematic view of the cooking system, depicting the cooking system configured to be powered by a battery and communicate with a remote computing device, according to another embodiment of the present invention.

With reference to FIGS. 11, 12 and 15, similar to the previous embodiment, the cooking system 200 may include a control portion 240 that may be associated with the control panel 228. Further, as set forth herein, the cooking system 200 may include the pellet feeder 212, the gas line portion 216, and one or more fans 241, each of which may be controlled at, and coupled to, the control portion 240. The control portion 240 may include various electrical compo-nents that each may be electrically interconnected, directly or indirectly (or operatively), to each other. For example, the control panel 228 or control portion 240 may include an input 242 and an output 244. The input 242 may include control buttons, knobs and/or a touch sensitive screen dis-play. The output 244 may include a display 246 that may be a touch sensitive display, which may also include, at least partially, the input 242. The control portion 240 associated with the control panel 228 may be a controller with multiple functioning electrical components sized and configured to control the functionality and temperatures of the cooking system 200 in a safe and controlled manner. For example, the control portion 240 may include one or more processors 248, memory 249 and software 250. The one or more processors 248, memory 249 and the software 250 may be configured to implement requests from the user via the input 242, as well as implement programmed routines based on the user's input, and provide temperature and cooking detail on the display 246 or the output 244, as known to one of ordinary skill in the art. Further, the one or more processors 248 and the software 250 may include Wi-Fi and Bluetooth functionality that may be configured to communicate with a remote computing device 252, such as a smart phone, tablet or computer or the like, for example.

Further, the control portion 240 may be operably coupled to one or more sensors 254, such as temperature sensors associated with the cooking portion 206 and/or the fire pot 214. In another embodiment, the one or more sensors 254 may include a temperature sensor positioned along an exter-nal surface of the cooking station 200 for obtaining an outside or ambient temperature. Such outside or ambient temperature data point may assist in adjustments for achiev-ing desired temperatures in the cooking portion 206 and the fire pot 214. Further, the one or more sensors 254 may include a flame sensor, such as flame sensor 144 positioned in the region 40 of the fire pot 28, as depicted in FIG. 7, for example. Also, the control portion 240 may be operably coupled to probe sensors 256 that may be sized and configured to be inserted within a food product, such as meat. Even further, the control portion 240 may be operably coupled to an ignitor 257 configured to ignite and combust gas in the fire pot 28, similar to the spark ignitor 140 described relative to FIG. 7.

As previously set forth, the control portion 240 may be coupled to input and output devices 242, 244. The output 244 or the display 246 of the cooking system 200 may provide temperature data of the food being cooked via the one or more probe sensors 256 as well as temperature data from the one or more sensors 254 of the cooking portion 206 of the cooking system 200. Such temperature data viewable on the display 246 may also be viewable on a display of the user's remote computing device 252, for example, via the Bluetooth or Wi-Fi functionality of the one or more proces-sors 248 and via application software on the user's remote computing device 252, as known to one of ordinary skill in the art. As such, the user may view the status of cooking data and temperature data of the cooking system 200 at a remote or separate location from the cooking station 200. Further, the user may change various parameters, such as tempera-ture and time period parameters, of the cooking system 200 via the application software on the remote computing device 252.

Furthermore, the control portion 240 may include a power supply portion 258 or the like and a battery charger circuit 260 that may be operably coupled to the battery 222. The power supply portion 258 may be configured to distribute and regulate the required power to the various components in the control portion 240 and the cooking system 200, as known to one of ordinary skill in the art. The power supply portion 258 may be positioned with the control portion 240 or positioned separately, but still interconnected to the various components of the control portion 240. The battery charger circuit 260 of the control portion 240 may be configured to direct power to the battery 222, upon the battery 222 needing to be recharged. The display 246 of the cooking station 200 may provide status detail of the battery 222, such as charging status and/or charged state of the battery 222. Further, the control portion 240 may also be coupled to one or more other circuits 264, such as a pellet feeder circuit, a gas supply circuit, and a fans circuit or any other circuits or electrical components that may be needed to control various components of the cooking system 200, such as the respective pellet feeder 212, the gas line portion 216, and the fans 241, as known to one of ordinary skill in the art. The control panel 228 may also be associated with an on/off switch 264, which may turn on and off the power supply to the control portion 240 of the cooking system 200.

The cooking system 200 may include other components and/or sub-components associated with the control portion 240 so that the cooking system 200 may effectively be controlled with user input, as known to one of ordinary skill in the art. For example, the control portion 240 may be operatively coupled to one or more control valves or sole-noids associated with the gas line portion 216 so that the gas may be turned off once the one or more sensors 254, such as the before-described temperature sensor and/or the flame sensor, associated with the fire pot 214 senses that the pellets have been ignited or not ignited, as the case may be. As such, upon the user inputting desired temperatures of the cooking portion 206 via the input 242 and initiating the appropriate preparation and pre-heating procedures of the cooking sys-tem 200, the control portion 240 may initiate gas flow through the gas line portion 216 to provide gas in the fire pot 214. The ignitor 257 may then provide a spark to ignite the gas in the fire pot 214. If the flame sensor of the one or more sensors 256 senses a flame, then the gas may continue to flow via the gas line portion 216. If the flame sensor does not sense a flame, the gas will be automatically turned off. Upon successfully igniting the gas so that the flame sensor senses a flame, the flame will ignite the pellets 21 (FIG. 8) in the fire pot 214. Upon a predetermined temperature being achieved in the fire pot 214, as sensed by a temperature sensor in the fire pot 214, the gas flow may be turned off. The fans 241 and the pellet feeder 212 (to advance pellets to the fire pot 214) may continue to operate to further reach the desired temperature in the cooking portion 206. In this manner, gas may be employed to initially ignite the pellets in the cooking system 200 so that the desired temperatures can be reached relatively quickly with a minimized amount of expended energy and/or fuel, as previously set forth herein. Further, as long as the battery 222 is charged, the cooking system 200 may readily be used at remote locations, even where power outlets may not be available.

The various structural components of the various embodiments of the outdoor pellet type cooking station set forth herein and any other structural components thereof may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking system configured to employ pellets as a fuel source for cooking and configured to initially ignite the pellets with a gas fuel, the cooking system comprising:

a main body extending to define a cooking portion and a heating portion, the cooking portion including a cooking surface, the heating portion positioned below the cooking portion of the main body, the main body extending upwards above the cooking surface;

a pellet feeding portion associated with the heating portion, the pellet feeding portion including a hopper and a pellet feeder, the hopper sized and configured to hold the pellets therein with a lower opening sized to funnel the pellets therethrough, the pellet feeder positioned adjacent the lower opening and configured to move the pellets from the lower opening;

a gas line configured to feed gas to the heating portion of the main body; and a fire pot positioned within the heating portion, the fire pot extending to define an interior surface that extends to define a side wall and a floor, the interior surface of the fire pot defining a feeder opening and a gas line opening therein, the feeder opening sized to facilitate the pellets move from the pellet feeder to fall from the pellet feeder to the floor of the fire pot, the fire pot including one or more metal screens and an ignitor, the one or more metal screens positioned to extend within the fire pot to define a region therein, the gas line having an end positioned in the gas line opening to disperse gas adjacent the floor and within the region of the fire pot and the ignitor positioned at least partially within the region defined by the one or more metal screens such that the one or more metal screens block the pellets from entering the region;

wherein the one or more metal screens is directly secured to the interior surface of the fire pot to be positioned against the floor of the fire pot so that the one or more metal screens surround the end of the gas line such that the end of the gas line is positioned adjacent the floor so that ignited gas is configured to burn pellets accumulated on the floor of the fire pot and adjacent the one or more metal screens.

2. The cooking system of claim 1, wherein the gas line is associated with a mixing structure located adjacent the end of the gas line, the mixing structure sized and configured to blend oxygen and gas to create a mixture thereof.

3. The cooking system of claim 2, wherein the mixing structure comprises curved fins sized and configured to swirl the oxygen and the gas.

4. The cooking system of claim 2, wherein the mixing structure comprises the one or more metal screens positioned within the fire pot, the one or more screens extending over the end of the gas line.

5. The cooking system of claim 1, wherein the gas line is associated with a mixing structure, the mixing structure including a screen associated with a tube of the gas line.

6. The cooking system of claim 1, further comprising a flame sensor and a thermocouple each positioned at least partially within the region defined by the one or more metal screens and each associated with a controller, wherein, upon the gas fuel being fed through the gas line, the flame sensor is configured to sense if there is a flame after generating a spark with the ignitor, the thermocouple is configured to sense a temperature within the region, and the controller is configured to shut-off the gas fuel being fed through the gas line upon (1) the flame sensor not sensing the flame within a pre-defined time period, and (2) the thermocouple sensing a pre-defined temperature indicating that the pellets are sufficiently ignited.

7. The cooking system of claim 6, wherein the one or more metal screens extend with multiple holes defined therein, the one or more metal screens sized and configured to block the pellets from the region to protect the flame sensor, the thermocouple and the ignitor, the multiple holes of the one or more metal screens sized and configured to allow for oxygen and gas to flow freely within the region and the fire pot.

8. The cooking system of claim 6, wherein the controller is powered through at least one of a power cord and a battery.

9. The cooking system of claim 1, wherein the fire pot includes one or more air inlets to allow for air flow into the fire pot to fan the pellets being burned.

10. The cooking system of claim 1, wherein the gas line extends to an end tube with the end such that the end tube extends through the gas line opening defined in the interior surface of the fire pot with the end of the end tube positioned adjacent the floor of the fire pot, the end tube including opposing openings defined in a side wall of the end tube to draw air flow into the end tube and through a mixing structure, the mixing structure positioned within the end tube between the opposing openings and the end of the end tube such that the mixing structure is sized and configured to mix oxygen from the air flow with the gas fuel.

11. The cooking system of claim 1, wherein the floor of the fire pot is a continuous solid structure.

12. The cooking system of claim 1, wherein the gas line includes an air flow opening, the air flow opening configured to draw oxygen into the gas line prior to being dispersed into fire pot.

13. The cooking system of claim 1, wherein the fire pot defines multiple air inlets therein, the air inlets configured to provide air flow to the interior surface of the fire pot.

14. A cooking station configured to employ pellets as a fuel source for cooking and configured to initially ignite the pellets with a gas fuel, the heating system comprising:

a main body extending to define a cooking portion and a heating portion, the cooking portion positioned above the heating portion;

a pellet feeding portion associated with the heating portion, the pellet feeding portion including a hopper and a pellet feeder, the hopper sized and configured to hold the pellets therein with a lower opening sized to funnel the pellets therethrough, the pellet feeder positioned adjacent the lower opening and configured to move the pellets from the lower opening toward the heating portion;

a fire pot positioned within the heating portion of the main body, the fire pot including an interior surface extending to define a side wall and a floor, the fire pot positioned to receive the pellets from the pellet feeder;

a gas line configured to feed gas to the fire pot, the gas line including an end tube portion, the end tube portion having an air hole, the end tube portion having an end positioned to disperse gas within the fire pot;

a mixing structure positioned between the air hole and the end of the end tube portion, the mixing structure sized and configured to mix oxygen and the gas fuel together; and one or more screens directly coupled to the interior surface of the fire pot to be positioned against the floor of the fire pot, the one or more screens surround the end of the gas line such that the end of the gas line is positioned adjacent the floor so that ignited gas is configured to burn pellets accumulated on the floor of the fire pot and adjacent the one or more screens, the one or more screens positioned to extend to define a region along and adjacent the floor of the fire pot, the one or more screens being sized and configured to block the pellets from the region.

15. The cooking station of claim 14, wherein the mixing structure comprises curved fins sized and configured to swirl the oxygen and the gas together.

16. The cooking station of claim 14, wherein the mixing structure comprises the one or more screens positioned within the fire pot, the one or more screens extending over the end of the end tube portion.

17. The cooking station of claim 14, wherein the pellet feeder and the gas line are electrically coupled to a controller, the controller configured to control an amount of pellets provided to the fire pot and configured to control dispersal of the gas through the gas line, the controller being powered through at least one of a power cord and a battery.

18. The cooking station of claim 14, wherein the floor of the fire pot is a continuous solid structure.

19. The cooking station of claim 14, wherein the gas line includes an air flow opening, the air flow opening configured to draw oxygen into the gas line prior to being dispersed into fire pot.

20. The cooking station of claim 14, wherein the fire pot defines multiple air inlets therein, the air inlets configured to provide air flow to the interior surface of the fire pot.

* * * * *